(12) United States Patent
Bruchmann et al.

(10) Patent No.: US 11,248,151 B2
(45) Date of Patent: Feb. 15, 2022

(54) SELF-COOLING FOAM-CONTAINING COMPOSITE MATERIALS

(71) Applicant: BASF SE, Ludwigshafen am Rhein (DE)

(72) Inventors: Bernd Bruchmann, Freinsheim (DE); Markus Schuette, Melle (DE); Patrick Kasper, Sexau (DE); Rolf Muelhaupt, Freiburg (DE)

(73) Assignee: BASF SE, Ludwigshafen am Rhein (DE)

( * ) Notice: Subject to any disclaimer, the term of this patent is extended or adjusted under 35 U.S.C. 154(b) by 281 days.

(21) Appl. No.: 16/098,552

(22) PCT Filed: Apr. 25, 2017

(86) PCT No.: PCT/EP2017/059810
§ 371 (c)(1),
(2) Date: Nov. 2, 2018

(87) PCT Pub. No.: WO2017/190989
PCT Pub. Date: Nov. 9, 2017

(65) Prior Publication Data
US 2019/0119541 A1  Apr. 25, 2019
US 2020/0216733 A9  Jul. 9, 2020

(30) Foreign Application Priority Data
May 4, 2016 (EP) .................................. 16168437

(51) Int. Cl.
C09K 5/04 (2006.01)
C08J 9/00 (2006.01)
C08J 9/12 (2006.01)
C08J 9/14 (2006.01)
C08L 75/08 (2006.01)
F25D 5/00 (2006.01)

(52) U.S. Cl.
CPC .............. *C09K 5/04* (2013.01); *C08J 9/0061* (2013.01); *C08J 9/0066* (2013.01); *C08J 9/125* (2013.01); *C08J 9/127* (2013.01); *C08J 9/141* (2013.01); *C08L 75/08* (2013.01); *F25D 5/00* (2013.01); *C08J 2203/182* (2013.01); *C08J 2205/05* (2013.01); *C08J 2205/06* (2013.01); *C08J 2207/00* (2013.01); *C08J 2309/00* (2013.01); *C08J 2323/04* (2013.01); *C08J 2323/10* (2013.01); *C08J 2325/04* (2013.01); *C08J 2361/28* (2013.01); *C08J 2367/00* (2013.01); *C08J 2375/02* (2013.01); *C08J 2375/04* (2013.01); *C08J 2377/00* (2013.01); *C08J 2379/08* (2013.01); *C08J 2401/26* (2013.01); *C08J 2429/10* (2013.01); *C08J 2433/04* (2013.01); *C08J 2433/24* (2013.01); *C08J 2439/00* (2013.01); *C08J 2439/04* (2013.01); *C08J 2471/00* (2013.01);

*C08J 2479/00* (2013.01); *C08J 2485/02* (2013.01); *C08L 2203/14* (2013.01); *C08L 2312/00* (2013.01)

(58) Field of Classification Search
CPC ... C09K 5/04; C08J 9/125; C08J 9/127; C08J 9/141; C08L 75/08
See application file for complete search history.

(56) References Cited

U.S. PATENT DOCUMENTS

| | | | |
|---|---|---|---|
| 3,306,966 A | 4/1963 | Matejcek et al. | |
| 5,670,102 A | 9/1997 | Perman et al. | |
| 6,787,245 B1* | 9/2004 | Hayes | B32B 27/36 428/480 |
| 9,174,089 B2* | 11/2015 | Shiga | C08G 18/7664 |
| 2003/0010486 A1 | 1/2003 | Serra et al. | |
| 2004/0254332 A1* | 12/2004 | Hayes | C08L 67/00 528/296 |
| 2006/0135668 A1* | 6/2006 | Hayes | B32B 27/36 524/430 |
| 2010/0041783 A1* | 2/2010 | Goto | C08J 9/141 521/154 |
| 2011/0060072 A1* | 3/2011 | Martin | C09C 1/28 523/105 |
| 2011/0281993 A1* | 11/2011 | Pinnavaia | C08K 3/34 524/445 |
| 2012/0308804 A1* | 12/2012 | Lendlein | B29C 44/352 428/221 |
| 2013/0245143 A1* | 9/2013 | Soane | C08K 9/04 521/88 |
| 2014/0272372 A1* | 9/2014 | Li | C09D 7/61 428/221 |
| 2016/0017086 A1 | 1/2016 | Grossman et al. | |

(Continued)

FOREIGN PATENT DOCUMENTS

DE 102006023585 A1 1/2007
JP 3544556 B2 7/2004
(Continued)

OTHER PUBLICATIONS

N. M. Nahar et al., Building and Environment 2003, 38, 109-116.
E. H. Amer, Energy 2006, 31, 1332-1344.
D. Karamanis, ICONCE 2014, 33-37.
A. C. C. Rotzetter et al., Advanced Materials 2012, 24, 5352-5356.
R. Liu, M. Fraylich and B. R. Saunders, Colloid. Poly. Sci. 2009, 287, 627-643.
V. Aseyev, H. Tenhu and F. M. Winnik, Adv. Polym. Sci. 2011, 242, 29-89.
International Search Report for International Patent Application No. PCT/EP21017/059810, dated May 26, 2017, 3 pages.
Office Action in corresponding IN Patent Application No. 201827045777, dated Dec. 15, 2020, 6 pages.
Office Action in corresponding Korean Application. No. 10-2018-7035044, dated Sep. 5, 2021, 5 pages.

*Primary Examiner* — Nahida Sultana
(74) *Attorney, Agent, or Firm* — Armstrong Teasdale LLP (57) ABSTRACT

Provided herein is a composite material that includes at least one thermoresponsive polymer and at least one organic foam material. Further provided herein is a method for producing the composite material and also to the use of the composite material for cooling and for regulating temperature.

5 Claims, 4 Drawing Sheets

(56) References Cited

U.S. PATENT DOCUMENTS

2017/0306118 A1    10/2017  Feichtenschlager et al.
2018/0029288 A1     2/2018  Von Vacano et al.
2018/0051171 A1     2/2018  Prissok et al.
2018/0194897 A1     7/2018  Desbois et al.

FOREIGN PATENT DOCUMENTS

| TW | 480580 B | 3/2002 |
|---|---|---|
| WO | 0054866 A1 | 9/2000 |
| WO | 2009108764 A1 | 9/2009 |
| WO | 2010046084 A1 | 4/2010 |
| WO | 2011138030 A2 | 11/2011 |
| WO | 2016142466 A1 | 9/2016 |
| WO | 2017013199 A1 | 1/2017 |
| WO | 2017045987 A1 | 3/2017 |
| WO | 2017045988 A1 | 3/2017 |
| WO | 2017190988 A1 | 11/2017 |

\* cited by examiner

SELF-COOLING FOAM-CONTAINING COMPOSITE MATERIALS

CROSS-REFERENCE TO RELATED APPLICATIONS

This application is the national stage entry of PCT/EP2017/059810, filed on Apr. 25, 2017, which claims the benefit of priority to European Patent Application No. 16168437.8, filed May 4, 2016, which are incorporated by reference in their entirety herein.

FIELD OF THE INVENTION

The present invention relates to a composite material which comprises at least one thermoresponsive polymer and at least one organic foam material. The present invention further relates to a method for producing the composite material and also to the use of the composite material for cooling and for regulating the temperature.

BACKGROUND

Especially in regions with high daytime temperatures and high levels of insolation, there is a need to cool homes in order to create a pleasant environment for people. Conventional cooling using air-conditioning units often leads to high energy consumption. Given that especially nowadays, the saving of energy is an important objective, there is a need accordingly for less energy-consuming methods of cooling. For this purpose, various methods have been described in the prior art.

N. M. Nahar et al., *Building and Environment* 2003, 38, 109-116 and E. H. Amer, *Energy* 2006, 31, 1332-1344 describe various methods of cooling homes in regions with high insolation and hence also high temperatures. First of all, the roofs of the test houses are equipped with reflective materials such as white cement or white tiles, and, secondly, thermal insulation materials such as Vermiculit are used on or beneath the roof. Cooling is accomplished, furthermore, by evaporation of water, from jute sacks, for example, which are placed over the roof, or from water ponds which are located on the roof. The most efficient cooling is that from evaporation of water. However, the water evaporation cooling methods described in N. M. Nahar et al., *Building and Environment* 2003, 38, 109-111 and E. H. Amer, *Energy* 2006, 31, 1332-1344 require relatively large quantities of water, which, moreover, must be continually resupplied.

D. Karamanis, *ICONCE* 2014, 33-37 describes porous materials, especially clay minerals, which are able to store water in their micropores and evaporate water from these pores.

A. C. C. Rotzetter et al., *Advanced Materials* 2012, 24, 5352-5356 describe the use of poly(N-isopropylacrylamide) hydrogels for cooling buildings. In this case the poly(N-isopropylacrylamide) hydrogel is introduced as a film between a PVC film and a nanoporous polycarbonate membrane. Though the cooling effect of the poly(N-isopropylacrylamide) hydrogel is relatively good, relatively large quantities of poly(N-isopropylacrylamide) are needed on account of its use as a film. Furthermore, the film is very sensitive mechanically and cannot be deployed everywhere.

US 2003/010486 describes a wetsuit for regulating skin temperature. Said wetsuit comprises a composite material including a layer of an open-cell foam material, the foam material accommodating 5 to 80 wt % of pulverulent hydrogel particles.

WO 2011/138030 describes a method for producing a composite material which comprises a polymer matrix and a thermoresponsive polymer. In the course of the production method, the starting compounds for the polymer matrix and also the thermoresponsive polymer are mixed with one another and subsequently the polymerization both of the polymer matrix and of the thermoresponsive polymer is initiated.

WO 2010/046084 describes the production of macroporous, polymeric, crosslinked materials. In this case a polymerizable monomer is mixed with individual beads, the monomer is polymerized, and the beads are subsequently liquefied and thus removed from the resultant polymer matrix. The beads are made of thermoresponsive polymers, for example.

WO 00/54866 describes filters wherein a gel is applied to a filter substrate, the gel altering its permeability as a result of temperature switching. Foam material is among the substrates which can be used.

The composite materials of US 2003/010486, of WO 2011/138030, of WO 2010/046084, and of WO 00/54866 are difficult to produce, since the thermoresponsive polymer frequently influences the polymerization of the foam materials. As a result they frequently have a low stability.

DESCRIPTION

There is therefore a need for composite materials capable of being used for cooling. The materials are to have the above-described disadvantages of the materials from the prior art to a reduced extent or not at all.

This object was achieved by means of a composite material which comprises the components (A) at least one thermoresponsive polymer and
(B) at least one organic foam material.

This object was further achieved by means of a composite material which comprises the components (A) at least one thermoresponsive polymer and
(B) at least one organic foam material, the component (A) having a lower critical solution temperature (LCST), the lower critical solution temperature (LCST) being in the range from 5 to 70° C., the composite material further comprising a component (C) at least one clay mineral.

It has surprisingly been found that the composite materials of the invention are able to accommodate more water and to release accommodated water more effectively than materials of the kind described in the prior art—for example, materials which contain only a thermoresponsive polymer, or composite materials which contain a superabsorbent and an organic foam material. The composite materials of the invention, therefore, are especially suitable for the cooling, for example, of buildings or electrical assemblies, primary or secondary batteries, through evaporation of water.

Superabsorbents for the purposes of the present invention are understood as polymers which are able to absorb a multiple of their mass—for example, 30 to 800 times their mass—of water and which in the range from 0 to 100° C. have no lower critical solution temperature (LCST); preferably, they have no lower critical solution temperature (LCST) at all.

Superabsorbents are understood for the purposes of the present invention more particularly to be crosslinked polyacrylates in which the carboxylic acid groups (—COOH) have been deprotonated and are present in the form of carboxylate groups (—COO). As counterions (cations), these crosslinked polyacrylates comprise alkali metals, such as sodium (Na+) and/or potassium (K+), for example.

It is advantageous, moreover, that water, particularly at temperatures above the lower critical solution temperature (LCST) of the at least one thermoresponsive polymer (component (A)), is released from the composite materials of the invention. Below the lower critical solution temperature (LCST) of component (A), only little or even no water is released from the composite materials of the invention, and so the cooling effect of the composite materials of the invention begins, in particular, only when higher temperatures are present, and hence when cooling is actually desired. If the component (A) has released its water above the LCST, it is able to accommodate water again, from the ambient air, for example, on falling below the LCST, and can then be utilized for cooling again.

It is advantageous, therefore, that the accommodation and release of water by the composite materials of the invention is reversible and can be controlled through the temperature. As a result of the reversible accommodation and release of water by the composite material, its cooling effect can be maintained even over long periods. The accommodation and release of water may be controlled through the natural heating and cooling phases of the ambient environment of the composite material.

As a result of the at least one clay mineral (component (C)), the composite material can additionally be produced particularly well and is therefore also particularly stable.

The present invention is illustrated in more detail hereinafter.

Composite Material

In accordance with the invention the composite material comprises components (A), at least one thermoresponsive polymer, and (B), at least one organic foam material.

The terms "component (A)" and "at least one thermoresponsive polymer" are used synonymously in the context of the present invention, and therefore possess the same meaning.

The same is true of "component (B)" and "at least one organic foam material". These terms are likewise used synonymously in the context of the present invention, and therefore possess the same meaning in the context of the present invention.

The composite material of the invention comprises for example in the range from 0.5 to 50 wt % of component (A) and in the range from 50 to 99.5 wt % of component (B), based in each case on the sum of the wt % of components (A) and (B), preferably based on the overall weight of the composite material.

The composite material preferably comprises in the range from 5 to 45 wt % of component (A) and in the range from 55 to 95 wt % of component (B), based on the sum of the wt % of components (A) and (B), preferably based on the overall weight of the composite material.

The composite material more preferably comprises in the range from 20 to 40 wt % of component (A) and in the range from 60 to 80 wt % of component (B), based in each case on the sum of the wt % of components (A) and (B), preferably based on the overall weight of the composite material.

Component (A) of the composite material is customarily distributed within component (B) of the composite material.

Component (A) of the composite material may be distributed uniformly (homogeneously) or nonuniformly in component (B) of the composite material. Preferably component (A) is distributed uniformly in component (B). In that case component (A) is in dispersion in component (B).

Component (A) is then the disperse phase, also called inner phase, and component (B) the dispersion medium, also called continuous phase.

Another subject of the present invention, therefore, is a composite material which comprises component (A) distributed, preferably uniformly distributed, in component (B).

Yet another subject of the present invention is a composite material which comprises component (A) in dispersion in component (B).

The composite material of the invention preferably further comprises a component (C), at least one clay mineral.

Another subject of the present invention is therefore a composite material which further comprises a component (C) at least one clay mineral.

The terms "component (C)" and "at least one clay mineral" are used synonymously in the context of the present invention, and therefore possess the same meaning.

In this embodiment the composite material comprises for example in the range from 0.5 to 50 wt % of component (A), in the range from 25 to 99.49 wt % of component (B), and in the range from 0.01 to 50 wt % of component (C), based in each case on the sum of the wt % of components (A), (B), and (C), preferably based on the overall weight of the composite material.

The composite material then preferably comprises in the range from 5 to 45 wt % of component (A), in the range from 10 to 94.9 wt % of component (B), and in the range from 0.1 to 45 wt % of component (C), based in each case on the sum of the wt % of components (A), (B), and (C), preferably based on the overall weight of the composite material.

The composite material then more preferably comprises in the range from 10 to 40 wt % of component (A), in the range from 20 to 89.5 wt % of component (B), and in the range from 0.5 to 20 wt % of component (C), based in each case on the sum of the wt % of components (A), (B), and (C), preferably based on the overall weight of the composite material.

Another subject of the present invention, therefore, is a composite material, said composite material comprising in the range from 0.05 to 50 wt % of component (A), in the range from 25 to 99.49 wt % of component (B) and in the range from 0.01 to 50 wt % of component (C), based in each case on the sum of the weight percentages of components (A), (B), and (C).

Where the composite material includes component (C), component (C) may for example, just like component (A), be distributed within component (B).

Preferably components (A) and (C) are uniformly distributed in component (B).

Where components (A) and (C) are uniformly distributed in component (B), components (A) and (C) are in dispersion in component (B).

In this embodiment it is possible for components (A) and (C) to form two separate phases in the continuous phase of component (B). Preferably components (A) and (C) form a common disperse phase in the continuous phase of component (B). In this embodiment, the disperse phase comprises a mixture of components (A) and (C).

If components (A) and (C) are present in the form of a mixture, it is possible for component (C) to be uniformly distributed within component (A). It is also possible, and preferred in accordance with the invention, for component (C) to be disposed on the surface of component (A) and/or for component (A) to be disposed on the surface of component (C).

It is preferred, furthermore, for the composite material to further comprise water.

Another subject of the present invention is therefore a composite material which further comprises water.

The weight ratio of water present to the composite material is then situated, for example, in the range from 5:100 to 300:100, preferably in the range from 10:100 to 200:100, and especially preferably in the range from 20:100 to 100:100.

Where the composite material of the invention includes water, it is preferred for the water to be distributed in component (A) at temperatures below the lower critical solution temperature (LCST) of component (A). At temperatures above the lower critical solution temperature (LCST) of component (A), the water is preferably distributed within component (B) and is evaporated and, in the process, delivered to the surroundings.

Furthermore, the composite material may also comprise further components. Such further components are known per se to the skilled person and are, for example, stabilizers, interface-active substances, flame retardants, or dyes.

The composite material may also additionally comprise further components which have been used in the preparation of component (A), such as, for example, comonomers, crosslinkers, stabilizers, and initiators. Further components which have been used in the preparation of component (A) are customarily contained in component (A) within the composite material.

The composite material comprises for example in the range from 0 to 50 wt % of the further components, preferably in the range from 0.5 to 20 wt %, and especially preferably in the range from 1 to 10 wt %, based in each case on the total weight of the composite material.

The wt % for components (A) and (B) and also, optionally, component (C) and the further components present in the composite material customarily add up to 100 wt %.

Component (A)

In accordance with the invention, component (A) is at least one thermoresponsive polymer.

"At least one thermoresponsive polymer" for the purposes of the present invention means not only exactly one thermoresponsive polymer but also a mixture of two or more thermoresponsive polymers.

A thermoresponsive polymer is understood for the purposes of the present invention to be a polymer which changes its water-solubility sharply at a lower critical solution temperature (LCST). At temperatures below the lower critical solution temperature (LCST), the water solubility of the polymer is good, and the thermoresponsive polymer is preferably completely miscible with water, whereas at temperatures greater or equal to the lower critical solution temperature (LCST) its water solubility is poor.

It is possible for a thermoresponsive polymer also to have an upper critical solution temperature (UCST). In that case, at temperatures above the upper critical solution temperature (UCST), the water solubility of the thermoresponsive polymer is good, and preferably the thermoresponsive polymer is completely miscible with water. At temperatures below the upper critical solution temperature (UCST), the water solubility of the thermoresponsive polymer is poor; there is therefore a miscibility gap between the thermoresponsive polymer and water. This is also described for example in R. Liu, M. Fraylich and B. R. Saunders, *Colloid. Poly. Sci.* 2009, 287, 627-643 and V. Aseyev, H. Tenhu and F. M. Winnik, *Adv. Polym. Sci.* 2011, 242, 29-89.

The lower critical solution temperature (LCST) is therefore understood as the temperature at and above which the thermoresponsive polymer and water form two phases, the thermoresponsive polymer and water thus exhibiting a miscibility gap.

Another subject of the present invention, therefore, is a composite material wherein component (A) has a lower critical solution temperature (LCST), the lower critical solution temperature (LCST) being the temperature at which component (A) and water form two phases.

Expressed differently, a subject of the present invention is also a composite material wherein component (A) has a lower critical solution temperature (LCST), the lower critical solution temperature (LCST) being the temperature at which component (A) and water exhibit a miscibility gap.

Without wishing to confine the invention to this, the idea is that at temperatures below the critical solution temperature (LCST), the thermoresponsive polymer takes the form of an open-chain coil. As a result, water is easily able to penetrate the polymer chains and cause swelling of the polymer. At temperatures below the lower critical solution temperature (LCST), the interactions between the water and the polymer chains are energetically more advantageous than the interactions of the polymer chains with one another within the coil. In contrast thereto, at temperatures greater than or equal to the lower critical solution temperature (LCST), the thermoresponsive polymer takes the form of a collapsed coil and the interactions of the polymer chains with one another within the coil are energetically more advantageous than the interactions between the water and the polymer chains. The water is in that case displaced from the thermoresponsive polymer, and the thermoresponsive polymer takes the form of a compact coil. Differently expressed, this means that the thermoresponsive polymer gives up water at temperatures equal to or above the lower critical solution temperature (LCST).

In accordance with the invention, the lower critical solution temperature (LCST) is determined by differential scanning calorimetry (DSC) or by turbidity measurement. In this regard, see also V. Aseyev, H. Tenhu and F. M. Winnik, *Adv. Polym. Sci.* 2011, 242, 42 and R. Liu, M. Fraylich and B. R. Saunders, *Colloid. Polym. Sci.* 2009, 287, 630.

Component (A) customarily has a lower critical solution temperature (LCST), the lower critical solution temperature (LCST) being preferably in the range from 5 to 70° C., more preferably in the range from 10 to 60° C., and especially preferably in the range from 15 to 50° C., determined by differential scanning calorimetry (DSC) or turbidity measurement.

Another subject of the present invention is therefore a composite material wherein component (A) has a lower critical solution temperature (LCST), the lower critical solution temperature (LCST) being in the range from 5 to 70° C.

Component (A) customarily has a glass transition temperature ($T_{g(A)}$). The glass transition temperature ($T_{g(A)}$) of component (A) is situated for example in the range from 15 to 150° C., preferably in the range from 20 to 100° C., and especially preferably in the range from 30 to 100° C., determined by differential scanning calorimetry (DSC). In this regard, see also DIN 53765 and DIN 51007.

It is self-evident that the glass transition temperature ($T_{g(A)}$) of component (A) refers to the water-free component (A). The glass transition temperature ($T_{g(A)}$) of component (A) therefore refers to the glass transition temperature ($T_{g(A)}$) of the pure component (A).

Furthermore, component (A) customarily has a melting temperature ($T_{m(A)}$). The melting temperature ($T_{m(A)}$) of component (A) is situated customarily in the range from 20 to 250° C., preferably in the range from 25 to 200° C., and especially preferably in the range from 50 to 180° C., determined by differential scanning calorimetry (DSC). In this regard see also DIN 53765.

Suitable as component (A) are all polymers which are thermoresponsive in the sense of the present invention. Component (A) is preferably selected from the group consisting of poly(meth)acrylates, poly(meth)acrylamides, poly (meth)acryloylpyrrolidines, poly(meth)acryloylpiperidines, poly-N-vinylamides, polyoxazolines, polyvinyloxazolidones, polyvinylcaprolactones, polyvinylcaprolactams, polyethers, hydroxypropylcelluloses, polyvinyl ethers, and polyphosphoesters. Component (A) is preferably selected from the group consisting of poly(meth)acrylates, poly (meth)acrylamides, poly-N-vinylamides, polyoxazolines, polyvinylcaprolactams, polyethers, hydroxypropylcelluloses, and polyvinyl ethers.

In another preferred embodiment, component (A) is selected from the group consisting of poly(meth)acrylates, poly(meth)acrylamides, poly(meth)acryloylpyrrolidines, poly(meth)acryloylpiperidines, poly-N-vinylamides, polyoxazolines, polyvinyloxazolidones, polyvinylcaprolactones, polyvinylcaprolactams, polyethers, polyvinyl ethers, and polyphosphoesters. Component (A) is preferably selected from the group consisting of poly(meth)acrylates, poly (meth)acrylamides, poly-N-vinylamides, polyoxazolines, polyvinylcaprolactams, polyethers, and polyvinyl ethers.

Another subject of the present invention, therefore, is a composite material wherein component (A) is selected from the group consisting of poly(meth)acrylates, poly(meth) acrylamides, poly(meth)acryloylpyrrolidines, poly(meth) acryloylpiperidines, poly-N-vinylamides, polyoxazolines, polyvinyloxazolidones, polyvinylcaprolactones, polyvinylcaprolactams, polyethers, hydroxypropylcelluloses, polyvinyl ethers, and polyphosphoesters.

Poly(meth)acrylates are understood in the context of the present invention to refer not only to polyacrylates but also to polymethacrylates, and also copolymers thereof with other monomers.

Suitable poly(meth)acrylates are known as such to the skilled person. The poly(meth)acrylates are preferably selected from the group consisting of poly(methyl 2-isobutyracrylate), poly[2-(dimethylamino)ethyl methacrylate] (PDMAEMA), poly[2-(2-ethoxyethoxy)ethyl acrylate] (PEEO2A), poly[2-(2-methoxyethoxy)ethyl methacrylate] (PMEO2MA), poly(2-hydroxypropyl acrylate) (PHPA), polyhydroxyethyl methacrylate (polyHEMA), and methoxy-terminated dendronized poly(meth)acrylates. Preferred poly (meth)acrylates are selected from the group consisting of poly(methyl 2-isobutyracrylate), poly[2-(dimethylamino) ethyl methacrylate] (PDMAEMA), poly[2-(2-ethoxyethoxy)ethyl acrylate] (PEEO2A), poly[2-(2-methoxyethoxy)ethyl methacrylate] (PMEO2MA), and poly(2-hydroxypropyl acrylate) (PHPA).

It is self-evident that polyacrylates used as thermoresponsive polymer are different from the branched polyacrylates described above and used as superabsorbents. Polyacrylates used as thermoresponsive polymer customarily have no carboxylate groups (—COOH$^-$), instead having exclusively carboxylic acid groups (—COOH).

Alkoxy-terminated hyperbranched poly(meth)acrylates may also be used.

Poly(meth)acrylamides for the purposes of the present invention are understood to be polyacrylamides, polymethacrylamides, and also copolymers thereof with other monomers. They are known as such to the skilled person. For example, poly(meth)acrylamides are selected from the group consisting of poly(N-n-propylacrylamide) (PnPAAm), poly(N-isopropylacrylamide) (PNiPAAm), poly(N-n-propylmethacrylamide) (PnPMAAm), poly(N-isopropylmethacrylamide) (PiPMAAm), poly(N-(L)-(1-hydroxymethyl)propylmethacrylamide) (P(L-HMPNAAm)), poly(N, N-diethylacrylamide) (PDEAAm), poly(N,N-ethylmethylacrylamide) (PNNEMAAm), poly(N-ethylmethacrylamide) (PNEMAAm), poly(N-ethylacrylamide) (PEAAm), poly(N-ethylmethacrylamide) (PEMAAm) and poly(N-cyclopropylacrylamide) (PcPAAm). Preferred poly(meth)acrylamides are selected from the group consisting of poly(N-n-propylacrylamide) (PnPAAm), poly(N-isopropylacrylamide) (PNiPAAm), poly(N-n-propylmethacrylamide) (PnPMAAm), poly(N-(L)-(1-hydroxymethyl) propylmethacrylamide) (P(L-HMPNAAm)), poly(N, N-diethylacrylamide) (PDEAAm), poly(N-ethylmethacrylamide) (PEMAAm) and poly(N-cyclopropylacrylamide) (PcPAAm).

The designation poly(meth)acryloylpyrrolidines encompasses, for the purposes of the present invention, not only polymethacryloylpyrrolidines but also polyacryloylpyrrolidines, and also copolymers thereof with other monomeres. They are known as such to the skilled person. A preferred poly(meth)acryloylpyrrolidine in accordance with the invention is poly(N-acryloylpyrrolidine).

For the purposes of the present invention, poly(meth) acryloylpiperidines encompass not only polyacryloylpiperidines but also polymethacryloylpiperidines, and also copolymers thereof with other monomeres. A preferred poly (meth)acryloylpiperidine is poly(N-acryloyl)piperidine (PAOPip).

Poly-N-vinylamides are known to the skilled person and are selected for example from the group consisting of poly(N-vinylpropylacetamide) and poly(N-vinylisobutyramide) (PViBAm).

As polyoxazolines it is possible to use all polyoxazolines known to the skilled person. The polyoxazolines are selected for example from the group consisting of poly(2-n-propyl-2-oxazoline) (PnPOz) and poly(2-isopropyl-2-oxazoline) (PiPOz).

Polyvinyloxazolidones are known to the skilled person. An example of a suitable polyvinyloxazolidone is poly(N-vinyl-5-methyl-2-oxazolidone).

Suitable polyvinylcaprolactones are known to the skilled person. Preference is given to poly(N-vinyl)caprolactone and copolymers thereof.

Suitable polyvinylcaprolactams are likewise known per se to the skilled person, an example being poly(N-vinylcaprolactam) (PVCL).

Suitable polyethers are known to the skilled person. The polyethers are selected for example from the group consisting of poly(ethylene glycol) (PEG), polyethylene glycol-polypropylene glycol copolyethers, hydrophobically endcapped poly(ethylene oxide-co-propylene oxide) and hyperbranched polyethers. The polyethers are preferably terminated by hydrophobic groups.

Suitable hydroxypropylcelluloses are known to the skilled person, examples being hydroxypropylcellulose (HPC) and hydroxypropylmethylcellulose (HPMC).

The preparation of hydroxypropylcellulose and hydroxypropylmethylcellulose is common knowledge to the skilled person, for example, through reaction of cellulose or methylcellulose with propylene oxide.

Suitable polyvinyl ethers are known as such to the skilled person and are selected for example from the group consisting of poly(methyl vinyl ether) (PMVEth), poly(2-methoxyethyl vinyl ether) (PMOVEth), poly(2-ethoxyethyl vinyl ether) (PEOVEth), poly(2-(2-ethoxy)ethoxyethyl vinyl ether), and poly(4-hydroxybutyl vinyl ether).

Also suitable are homopolymers or copolymers prepared from oligovinyl ethers, such as ethylene oxide vinyl ether, propylene oxide vinyl ether or n-butylene oxide vinyl ether.

Suitable polyphosphoesters are likewise known to the skilled person and are selected for example from the group consisting of poly(2-ethoxy-2-oxo-1,3,2-dioxaphospholane) and poly(2-isopropoxy-2-oxo-1,3,2-dioxaphospholane). Poly(2-ethoxy-2-oxo-1,3,2-dioxaphospholane) is also known by the name poly(ethylethylene phosphate). Poly(2-isopropoxy-2-oxo-1,3,2-dioxaphospholane) is also known under the name poly(isopropylethylene phosphate).

With particular preference, therefore, component (A) is selected from the group consisting of poly(methyl 2-isobutyracrylate), poly[2-(dimethylamino)ethyl methacrylate] (PDMAEMA), poly[2-(2-ethoxyethoxy)ethyl acrylate] (PEEO2A), poly[2-(2-methoxyethoxy)ethyl methacrylate] (PMEO2MA), poly(2-hydroxypropyl acrylate) (PHPA), poly(N-n-propylacrylamide) (PnPAAm), poly(N-isopropylacrylamide) (PNiPAAm), poly(N-n-propylmethacrylamide) (PnPMAAm), poly(N-(L)-(1-hydroxymethyl)-propylmethacrylamide) (P(L-HMPNAAm)), poly(N,N-diethylacrylamide) (PDEAAm), poly(N-ethylmethacrylamide) (PEMAAm), poly(N-cyclopropylacrylamide) (PcPAAm), poly(N-vinylpropylacetamide), poly(N-vinylisobutyramide) (PViBAm), poly(2-n-propyl-2-oxazoline) (PnPOz), poly(2-isopropyl-2-oxazoline) (PiPOz), polyvinylcaprolactam (PVCL), polyethylene glycols (PEG), polyethylene glycol-polypropylene glycol copolyethers, hydrophobically endcapped poly(ethylene oxide-co-propylene oxide) polyethers, hyperbranched polyethers, hydroxypropylcellulose (HPC), poly(methyl vinyl ether) (PMVEth), poly(2-methoxyethyl vinyl ether) (PMOVEth), poly(2-ethoxyethyl vinyl ether) (PEOVEth), poly(2-(2-ethoxy)ethoxyethyl vinyl ether), and poly(4-hydroxybutyl vinyl ether).

Component (B)

In accordance with the invention, component (B) is at least one organic foam material.

For the purposes of the present invention, "at least one organic foam material" refers both to exactly one organic foam material and also to a mixture of two or more organic foam materials.

A mixture of two or more organic foam materials is also referred to as a blend or as a hybrid foam material.

An organic foam material for the purposes of the present invention means an organic polymer which has a porous structure and a low density. Organic foam materials in the context of the present invention are therefore defined in accordance with DIN 7726, May 1982.

For example, the density of component (B) is in the range from 10 to 1000 g/cm$^3$, preferably in the range from 20 to 500 g/cm$^3$, and especially preferably in the range from 30 to 200 g/cm$^3$. Determining the density of foam materials is described for example in Becker/Braun, *Plastics Handbook, volume 7, Polyurethane, Carl Hanser Verlag Munich Vienna* 1993, section 9.2.4.

Component (B) customarily has a porous structure. This means that the component (B) has cells. These cells customarily have a size in the range from 1 to 3000 μm, preferably in the range from 10 to 1000 μm, and especially preferably in the range from 20 to 500 μm, determined by microscopy and image analysis. In this regard, see also Becker/Braun, *Plastics Handbook, volume 7, Polyurethane, Carl Hanser Verlag Munich Vienna* 1993, section 9.2.5 and "Characterization of the pore structure of flexible PUR foams by image analysis", M. Herbst, W. Rasemann, B. Mündörfer, A. Böhme, FAPU 16, 2003.

Component (B) may be closed-cell or open-cell. Preferably component (B) is open-cell.

In the case of closed-cell foam materials, the individual cells in the foam material do not communicate with one another, being each closed off per se.

In the case of open-cell foam materials, in contrast, the cells are in communication with one another.

With preference in accordance with the invention, component (B) is open-cell to an extent of at least 10%, more preferably at least 50%, and especially preferably at least 80%. The open-cell proportion is determined by an air comparison pycnometer as described for example in Becker/Braun, *Plastics Handbook, volume 7, Polyurethane, Carl Hanser Verlag Munich Vienna* 1993, section 9.2.6.

Another subject of the present invention is therefore a composite material wherein component (B) is open-cell to an extent of at least 50%.

Suitability as component (B) is possessed by all organic foam materials known to the skilled person.

Component (B) may for example be a rigid organic foam material, a semi-rigid organic foam material or a flexible organic foam material. Component (B) is preferably a flexible organic foam material in accordance with the classification of DIN 7726, May 1982 status.

Component (B) is preferably selected from the group consisting of melamine foam materials, polyurethane foam materials, polyurea foam materials, polyester foam materials, polyamide foam materials, polyimide foam materials, polystyrene foam materials, polyethylene foam materials, polypropylene foam materials, polybutadiene foam materials, and polyisoprene foam materials. Component (B) is more preferably selected from the group consisting of melamine foam materials, polyurethane foam materials, polyurea foam materials, polyamide foam materials, polyimide foam materials, polystyrene foam materials; especially preferably, component (B) is selected from the group consisting of melamine foam materials and polyurethane foam materials. Most preferably component (B) is selected from the group consisting of polyurethane foam materials.

Another subject of the present invention is therefore a composite material wherein component (B) is selected from the group consisting of melamine foam materials, polyurethane foam materials, polyurea foam materials, polyester foam materials, polyamide foam materials, polyimide foam materials, polystyrene foam materials, polyethylene foam materials, polypropylene foam materials, polybutadiene foam materials, and polyisoprene foam materials.

Methods for producing organic foam materials are known per se to the skilled person.

Component (B) customarily has one or more glass transition temperatures ($T_{G(B)}$). The glass transition temperatures ($T_{G(B)}$) of component (B) are customarily in the range from −40 to 150° C., preferably in the range from −30 to 120° C., and especially preferably in the range from −30 to 100° C., determined by differential scanning calorimetry (DSC). In this regard, see also DIN 53765 and DIN 51007.

Component (C)

In one preferred embodiment of the invention, the composite material further comprises a component (C) at least one clay mineral.

"At least one clay mineral" for the purposes of the present invention means either exactly one clay mineral or else a mixture of two or more clay minerals.

"Clay minerals" for the purposes of the present invention are inorganic materials of layered construction. Inorganic materials of layered construction are known as such to the skilled person. Preferred inorganic materials of layered construction are layered silicates.

Component (C) is therefore preferably at least one inorganic material of layered construction, more preferably at least one layered silicate.

Another subject of the present invention, then, is a composite material wherein component (C) is an inorganic material of layered construction.

The layered silicates particularly preferred in accordance with the invention are known as such to the skilled person.

Layered silicates customarily comprise silicon atoms surrounded tetrahedrally (coordinated) by oxygen atoms. Particularly preferred in accordance with the invention are layered silicates which comprise aluminum atoms surrounded octahedrally (coordinated) by oxygen atoms. Furthermore, layered silicates customarily comprise further elements, such as sodium, barium or calcium, for example.

In the layered silicates, the silicon atoms coordinated tetrahedrally by oxygen atoms are customarily disposed in layer form (tetrahedral layer). Similarly, the aluminum atoms coordinated octahedrally by oxygen atoms are customarily disposed in layer form (octahedral layer). In the layered silicates, the octahedral layers may alternate with the tetrahedral layers; it is also possible, for example, for an octahedral layer to follow two tetrahedral layers.

Water may be intercalated between the layers of the at least one clay mineral. As a result, the at least one clay mineral is swollen. The intercalation of water into the layers of the at least one clay mineral is reversible, meaning that the water between the layers may be removed again by drying.

Component (C) is therefore preferably swellable.

"Swellable" for the purposes of the present invention therefore means that component (C) is able to intercalate water between the layers and that this water can be removed again from the space between the layers by drying.

If water has been intercalated between the layers of component (C), component (C) is in a swollen state. If there is no water intercalated between the layers of component (C), component (C) is unswollen.

Component (C) is preferably selected from the group consisting of montmorillonites and kaolinites.

Another subject of the present invention is therefore a composite material wherein component (C) is selected from the group consisting of montmorillonites and kaolinites.

Component (C) may be used as the pure at least one clay mineral. Component (C) is preferably used in the form of rock which contains the at least one clay mineral, optionally also as a mixture with other accompanying minerals, such as mica, quartz, feldspar, pyrite and/or calcite, for example.

Rocks which comprise the at least one clay mineral are known to the skilled person and are, for example, kaolin and bentonite.

If component (C) is therefore used as rock, then component (C) is preferably selected from the group consisting of kaolin and bentonite.

Another subject of the present invention is therefore a composite material wherein component (C) is selected from the group consisting of kaolin and bentonite.

Kaolin is known as such to the skilled person. The main constituent of kaolin is the mineral kaolinite. Furthermore, kaolin may also comprise other minerals. For the purposes of the present invention, the term "kaolin", moreover, also refers to the thermally activated variants of kaolin, such as metakaolin for example.

Bentonite is likewise known to the skilled person. The main constituent of bentonite is montmorillonite. In addition, bentonite may further comprise quartz, mica, feldspar, pyrite or calcite, for example.

Production of the Composite Material

The composite material of the invention may be produced by any methods known to the skilled person. The composite material of the invention is preferably produced by a method comprising the following steps:

a) providing a mixture (M) which comprises the at least one thermoresponsive polymer (A), b) preparing the at least one organic foam material (B) in the presence of the mixture (M) provided in step a) to give the composite material.

Another subject of the present invention, therefore, is a method for producing a composite material of the invention, comprising the steps of:

a) providing a mixture (M) which comprises the at least one thermoresponsive polymer (A), b) preparing the at least one organic foam material (B) in the presence of the mixture (M) provided in step a) to give the composite material.

The mixture (M) provided in step a) comprises component (A). The mixture (M) may, furthermore, comprise further components. The mixture (M) preferably further comprises a component (C)—at least one clay mineral.

Another subject of the present invention is therefore a method wherein the mixture (M) provided in step a) further comprises at least one clay material (C).

A further subject of the present invention is a method for producing the composite material of the invention, comprising the steps of a) providing a mixture (M) which comprises the at least one thermoresponsive polymer (A), b) preparing the at least one organic foam material (B) in the presence of the mixture (M) provided in step a) to give the composite material, wherein the mixture (M) provided in step a) further comprises at least one clay material (C).

Component (C) preferably included additionally in the mixture (M) is subject to the above-described embodiments and preferences for the component (C) optionally included in the composite material, mutatis mutandis.

Where the mixture (M) provided in step a) further includes at least one clay mineral (C), the mixture (M) comprises for example in the range from 99.5 to 10 wt % of component (A) and in the range from 0.5 to 90 wt % of component (C), based in each case on the sum of the weight percentages of components (A) and (C), preferably based on the overall weight of the mixture (M).

In that case the mixture (M) preferably comprises in the range from 99 to 50 wt % of component (A) and in the range from 1 to 50 wt % of component (C), based in each case on the sum of the weight percentages of components (A) and (C), preferably based on the overall weight of the mixture (M).

In that case the mixture (M) especially preferably comprises in the range from 95 to 70 wt % of component (A) and in the range from 5 to 30 wt % of component (C), based in each case on the sum of the weight percentages of components (A) and (C), preferably based on the overall weight of the mixture (M).

The mixture (M) comprises the at least one thermoresponsive polymer (A) preferably in the form of particles, and also comprises the at least one clay mineral (C) preferably in the form of particles. The particles of the at least one thermoresponsive polymer (A) have for example a D50 in the range from 200 nm to 5 mm; the particles of the at least one clay mineral (C) have for example a D50 in the range from 50 nm to 3 mm, determined by light scattering and/or sieving.

The particles of the at least one thermoresponsive polymer (A) preferably have a D50 in the range from 300 nm to 4 mm, and the particles of the at least one clay mineral (C) preferably have a D50 in the range from 50 nm to 1 mm, determined by light scattering and/or sieving.

The particles of the at least one thermoresponsive polymer (A) especially preferably have a D50 in the range from 500 nm to 3 mm, and the particles of the at least one clay mineral (C) preferably have a D50 in the range from 100 nm to 0.5 mm, determined by light scattering and/or sieving.

Another subject of the present invention is therefore a method wherein the mixture (M) provided in step a) comprises the at least one thermoresponsive polymer (A) in the form of particles and comprises the at least one clay mineral (C) in the form of particles, the particles of the at least one thermoresponsive polymer (A) having a D50 in the range from 200 nm to 5 mm, and the particles of the at least one clay mineral (C) having a D50 in the range from 50 nm to 3 mm, determined by light scattering and/or sieving.

The "D50" is understood as the particle size at which 50 vol % of the particles, based on the total volume of the particles, are smaller than or equal to the D50 value and 50 vol % of the particles, based on the total volume of the particle size, are larger than the D50 value.

The mixture (M) may further comprise at least one dispersion medium. A preferred dispersion medium is water.

Preferably the mixture (M) contains no water, and especially preferably the mixture (M) contains no dispersion medium.

It is therefore preferred for the mixture (M) provided in step a) to be dry.

"Dry" in the context of the present invention means that the mixture (M) contains less than 10 wt %, preferably less than 5 wt %, and more preferably less than 3 wt % of water, and especially preferably the mixture (M) contains less than 10 wt %, preferably less than 5 wt %, and especially preferably less than 1 wt % of dispersion medium, based in each case on the total weight of the mixture (M).

The mixture (M) may be provided in step a) by any methods known to the skilled person. The mixture (M) in step a) is preferably provided by polymerization of at least one monomer selected from the group consisting of (meth)acrylates, (meth)acrylamides, (meth)acryloylpyrrolidines, (meth)acryloylpiperidines, N-vinylamides, oxazolines, vinyloxazolidones, vinylcaprolactones, vinylcaprolactams, alkylene oxides, vinyl ethers or phosphoesters. The polymerization of the at least one monomer gives the at least one thermoresponsive polymer (A).

The mixture (M) in step a) is more preferably provided by polymerization of at least one monomer selected from the group consisting of (meth)acrylates, (meth)acrylamides, (meth)acryloylpyrrolidines, (meth)acryloylpiperidines, N-vinylamides, vinyloxazolidones, vinylcaprolactones, vinylcaprolactams, and vinyl ethers.

These polymerizations are known to the skilled person and are, for example, radical chain-growth polymerizations, polyadditions or polycondensations.

Another subject of the present invention is therefore a method wherein the providing of the mixture (M) in step a) comprises a polymerization of at least one monomer selected from the group consisting of (meth)acrylates, (meth)acrylamides, (meth)acryloylpyrrolidines, (meth)acryloylpiperidines, N-vinylamides, oxazolines, vinyloxazolidones, vinylcaprolactones, vinylcaprolactams, alkylene oxides, vinyl ethers, and phosphoesters, to give the at least one thermoresponsive polymer (A).

(Meth)acrylates for the purposes of the present invention encompass both acrylates and methacrylates. Suitable (meth)acrylates are known as such to the skilled person and are selected for example from the group consisting of methyl 2-isobutyracrylate, 2-(dimethylamino)ethyl methacrylate, 2-(2-ethoxyethoxy)ethyl acrylate, 2-(2-methoxyethoxy) ethyl methacrylate, 2-hydroxyethyl methacrylate, and 2-hydroxypropyl acrylate.

The term (meth)acrylamides for the purposes of the present invention encompasses both acrylamides and methacrylamides. Suitable (meth)acrylamides are selected for example from the group consisting of N-n-propylacrylamide, N-isopropylacrylamide, N-n-propylmethacrylamide, N-isopropylmethacrylamide, N-(L)-1-hydroxymethylpropyl-methacrylamide, N—N-diethylacrylamide, N,N-ethylmethacrylamide, and N-cyclo-propylacrylamide.

The term (meth)acryloylpyrrolidines for the purposes of the present invention encompasses both acryloylpyrrolidines and methacryloylpyrrolidines. Preferred (meth)acryloylpyrrolidines are N-acryloylpyrrolidines.

(Meth)acryloylpiperidines for the purposes of the present invention are both acryloylpiperidines and methacryloylpiperidines. Preferred (meth)acryloylpiperidines are N-acryloylpiperidines.

Suitable N-vinylamides are known as such to the skilled person and are, for example, N-vinylpropylacetamide or N-vinylisobutyramide.

Suitable oxazolines are likewise known to the skilled person and are selected for example from the group consisting of 2-(n-propyl)2-oxazoline and 2-isopropyl-2-oxazoline.

Suitable vinyloxazolidones are likewise known to the skilled person. A preferred vinyloxazolidone is N-vinyl-5-methyl-2-oxazolidone.

Suitable vinylcaprolactones are also known to the skilled person, as are vinylcaprolactams.

Suitable alkylene oxides are likewise known to the skilled person and are selected for example from the group consisting of ethylene oxide and propylene oxide.

Suitable vinyl ethers are likewise known to the skilled person and are selected for example from the group consisting of methyl vinyl ether, 2-methoxyethyl vinyl ether, 2-ethoxyethyl vinyl ether, 2-(2-ethoxy)ethoxyethyl vinyl ether, and 4-hydroxybutyl vinyl ether.

Suitable phosphoesters are known to the skilled person and are, for example, 2-ethoxy-2-oxo-1,3,2-dioxaphospholane and 2-isopropoxy-2-oxo-1,3,2-dioxaphospholane.

If the at least one thermoresponsive polymer (A) is a copolymer, it is self-evident that for the purpose of providing the mixture (M) in step a), at least one comonomer is used in addition to the at least one monomer. Such comonomers are known to the skilled person and are, for example, styrene, methylstyrene, $C_1$-$C_6$ alkyl acrylates, divinylbenzene, diacrylates, preferably based on $C_2$ to $C_6$ diols, N,N-methylenebisacrylamide or [3-(methacryloylamino)propyl] trimethylammonium chloride.

If the mixture (M) provided in step a) further comprises a component (C), it is preferred for the polymerization of the at least one monomer to take place in the presence of the at least one clay mineral (C).

Another subject of the present invention, therefore, is a method wherein the providing of the mixture (M) in step a) comprises in the polymerization of at least one monomer selected from the group consisting of (meth)acrylates, (meth)acrylamides, (meth)acryloyl-pyrrolidines, (meth)acryloylpiperidines, N-vinylamides, oxazolines, vinyloxazolidones, vinylcaprolactones, vinylcaprolactams, alkylene oxides, vinyl ethers, and phosphoesters, to give the at least one thermoresponsive polymer (A), in the presence of the at least one clay mineral (C).

The at least one monomer may be polymerized by any methods known to the skilled person. Suitable methods for polymerizing the at least one monomer are, for example, a radical chain-growth polymerization, a polyaddition or a polycondensation.

The polymerization takes place preferably by radical chain-growth polymerization in the presence of an initiator.

The providing of the mixture (M) in step a), if the mixture (M) provided further comprises at least one clay mineral (C), preferably comprises the following steps a1) providing a first dispersion which comprises the at least one clay mineral (C), a dispersion medium selected from the group consisting of water and an organic solvent, and at least one monomer selected from the group consisting of (meth)acrylates, (meth)acrylamides, (meth)acryloylpyrrolidines, (meth)acryloylpiperidines, N-vinylamides, oxazolines, vinyloxazolidones, vinylcaprolactones, vinylcaprolactams, alkylene oxides, vinyl ethers, and phosphoesters, a2) polymerizing the at least one monomer present in the first dispersion provided in step a1), in the first dispersion, to give the at least one thermoresponsive polymer (A), to give a second dispersion which comprises the at least one clay mineral (C), the dispersion medium, selected from the group consisting of water and an organic solvent, and the at least one thermoresponsive polymer (A), a3) drying the second dispersion obtained in step a2) to give the mixture (M).

Another subject of the present invention, therefore, is a method wherein the providing of the mixture (M) in step a) comprises the following steps:

a1) providing a first dispersion which comprises the at least one clay mineral (C), a dispersion medium selected from the group consisting of water and an organic solvent, and at least one monomer selected from the group consisting of (meth)acrylates, (meth)acrylamides, (meth)acryloylpyrrolidines, (meth)acryloylpiperidines, N-vinylamides, oxazolines, vinyloxazolidones, vinylcaprolactones, vinylcaprolactams, alkylene oxides, vinyl ethers, and phosphoesters, a2) polymerizing the at least one monomer present in the first dispersion provided in step a1), in the first dispersion, to give the at least one thermoresponsive polymer (A), to give a second dispersion which comprises the at least one clay mineral (C), the dispersion medium, and the at least one thermoresponsive polymer (A), a3) drying the second dispersion obtained in step a2) to give the mixture (M).

"A dispersion medium" for the purposes of the present invention refers both to exactly one dispersion medium and to a mixture of two or more dispersion media.

In accordance with the invention the dispersion medium is selected from water and organic solvents, and preferably the dispersion medium is water.

For the organic solvent which may be used as the dispersion medium, all organic solvents known to the skilled person are suitable. Preference is given to low-boiling organic solvents, with "low-boiling organic solvents" referring to organic solvents which having a boiling temperature of <140° C. Organic solvents of this kind are known to the skilled person and are selected for example from the group consisting of methanol, ethanol, toluene, tetrahydrofuran, xylene, ethyl ester, and butyl acetate.

A first dispersion provided in step a1) is preferably a dispersion which comprises the at least one clay mineral (C), the dispersion medium, and at least one monomer selected from the group consisting of (meth)acrylates, (meth)acrylamides, (meth)acryloylpyrrolidines, (meth)acryloylpiperidines, N-vinylamides, vinyloxazolidones, vinylcaprolactones, vinylcaprolactams, and vinyl ethers.

The first dispersion provided in step a1) comprises for example in the range from 0.5 to 30 wt % of the at least one clay mineral (C), in the range from 40 to 94.5 wt % of the dispersion medium, and in the range from 5 to 59.5 wt % of the at least one monomer, based in each case on the sum of the weight percentages of the at least one clay mineral (C), of the dispersion medium, and of the at least one monomer, preferably based on the overall weight of the first dispersion.

The first dispersion preferably comprises in the range from 0.5 to 20 wt % of the at least one clay mineral (C), in the range from 50 to 89.5 wt % of the dispersion medium, and in the range from 10 to 49.5 wt % of the at least one monomer, based in each case on the sum of the weight percentages of the at least one clay mineral (C), of the dispersion medium, and of the at least one monomer, preferably based on the overall weight of the first dispersion.

The first dispersion more preferably comprises in the range from 0.5 to 15 wt % of the at least one clay mineral, in the range from 60 to 84.5 wt % of the dispersion medium, and in the range from 15 to 39.5 wt % of the at least one monomer, based in each case on the sum of the weight percentages of the at least one clay mineral (C), of the dispersion medium, and of the at least one monomer, preferably based on the overall weight of the first dispersion.

Furthermore, the first dispersion may comprise additional components. Examples of such additional components are initiators or comonomers to the at least one monomer.

Suitable initiators are known as such to the skilled person and are selected fittingly for the at least one monomer. Examples of suitable initiators are ammonium peroxodisulfate (APS), potassium peroxodisulfate (KPS), azadiisobutyronitrile (AIBN), dibenzoyl peroxide (DBPO), or N,N,N', N'-tetramethylethylenediamine (TEMEDA).

The first dispersion comprises the at least one monomer customarily in solution in the dispersion medium. Where additional components are present in the dispersion, they are customarily likewise in solution in the dispersion medium. The at least one clay mineral (C) is customarily in suspension in the solution of the dispersion medium and in the at least one monomer and also, optionally, the additional components. The dispersion medium with the dissolved at least one monomer and, optionally, the additional components then forms the dispersion medium, also called continuous phase, and the at least one clay mineral (C) forms the disperse phase, also called inner phase.

The at least one clay mineral (C) may be present in swollen or unswollen state in the first dispersion in step a1). Preferably the at least one clay mineral (C) is present in a swollen state.

Another subject of the present invention, therefore, is a method wherein the at least one clay mineral (C) is in swollen state in the first dispersion in step a1).

It is preferred, moreover, that for the purpose of providing the first dispersion in step a1), the at least one clay mineral (C) is first swollen in water and subsequently the at least one monomer and also, optionally, the additional components are added to this dispersion, comprising water and the swollen at least one clay mineral (C).

It is possible, moreover, that for providing the first dispersion in step a1), first of all the at least one clay mineral (C) is swollen in water and subsequently the swollen at least one clay mineral (C) is added to the dispersion medium, to the at least one monomer, and, optionally, to the additional components.

In step a2), the at least one monomer present in the first dispersion provided in step a1) is polymerized in the first dispersion. This gives the at least one thermoresponsive polymer (A), producing a second dispersion which comprises the at least one clay mineral (C), the dispersion medium, and the at least one thermoresponsive polymer (A).

The polymerization of the at least one monomer to give the at least one thermoresponsive polymer (A) is known as such to the skilled person.

The second dispersion obtained in step a2) comprises the at least one clay mineral (C), the dispersion medium, and the at least one thermoresponsive polymer (A).

For example, the second dispersion comprises in the range from 0.5 to 30 wt % of the at least one clay mineral (C), in the range from 40 to 94.5 wt % of dispersion medium, and in the range from 5 to 59.5 wt % of the at least one thermoresponsive polymer (A), based in each case on the sum of the weight percentages of the at least one clay mineral (C), the dispersion medium, and the at least one thermoresponsive polymer (A), preferably based on the overall weight of the second dispersion.

Preferably, the second dispersion comprises in the range from 1 to 20 wt % of the at least one clay mineral (C), in the range from 49.5 to 94 wt % of dispersion medium, and in the range from 5 to 49.5 wt % of the at least one thermoresponsive polymer (A), based in each case on the sum of the weight percentages of the at least one clay mineral (C), the dispersion medium, and the at least one thermoresponsive polymer (A), preferably based on the overall weight of the second dispersion.

More preferably, the second dispersion comprises in the range from 1 to 15 wt % of the at least one clay mineral (C), in the range from 59.5 to 94 wt % of dispersion medium, and in the range from 5 to 39.5 wt % of the at least one thermoresponsive polymer (A), based in each case on the sum of the weight percentages of the at least one clay mineral (C), the dispersion medium, and the at least one thermoresponsive polymer (A), preferably based on the overall weight of the second dispersion.

Furthermore, the second dispersion customarily further comprises the additional components which were present in the first dispersion. It is also possible for the second dispersion still to include residues of the at least one monomer.

The sum of the weight percentages of the at least one clay mineral (C), the dispersion medium, and the at least one thermoresponsive polymer (A) that are present in the second dispersion, and also, optionally, of the additional components, customarily makes 100 wt %.

If the second dispersion includes additional components, they are customarily in solution in the dispersion medium.

The at least one clay mineral (C) and the at least one thermoresponsive polymer (A) are customarily in suspension in the dispersion medium within the second dispersion. In that case the dispersion medium forms the dispersion medium, also called continuous phase, and the at least one clay mineral (C) and the at least one thermoresponsive polymer (A) form the disperse phase, also called internal phase.

The at least one clay mineral (C) and the at least one thermoresponsive polymer (A) may be present separately from one another in the second dispersion. It is also possible, and preferred in accordance with the invention, for the at least one clay mineral (C) and the at least one thermoresponsive polymer (A) to be present as a mixture in the second dispersion.

Where the at least one clay mineral (C) and the at least one thermoresponsive polymer (A) are present as a mixture, it is preferred for the at least one thermoresponsive polymer (A) to be applied on the surface of the at least one clay mineral and/or for the at least one clay mineral (C) to be applied on the surface of the at least one thermoresponsive polymer (A).

It is also preferred in accordance with the invention for the at least one clay mineral (C) to be present in a swollen state during the polymerization in step a2).

Another subject of the present invention is therefore a method wherein the at least one clay mineral (C) is present in a swollen state during the polymerization in step a2).

In step a3), the second dispersion obtained in step a2) is dried to give the mixture (M).

The second dispersion obtained in step a2) may be dried by any methods known to the skilled person—for example, by means of spray drying, centrifugation, drying at room temperature, under reduced pressure, or at elevated temperatures. Combinations are of course also possible. The dispersion obtained in step a2) is dried preferably by spray drying.

Another subject of the present invention is therefore a method wherein the second dispersion is dried by spray drying in step a3) to give the mixture (M).

It is therefore preferred that the providing of the mixture (M) in step a) comprises spray drying of the at least one thermoresponsive polymer (A) in the presence of the at least one clay mineral (C).

Another subject of the present invention is therefore a method wherein the providing of the mixture (M) in step a) comprises spray drying of the at least one thermoresponsive polymer (A) in the presence of the at least one clay mineral (C).

Methods for spray drying are known as such to the skilled person.

In step b), the at least one organic foam material (B) is produced in the presence of the mixture (M) provided in step a).

Suitability for producing the at least one organic foam material (B) is possessed by all methods known to the skilled person for producing the organic foam material (B).

The organic foam material may be produced, for example, by providing a melt of the polymer contained in the organic foam material, said melt then being foamed. All methods known to the skilled person are suitable for the foaming.

It is also possible for individual components of the polymer present in the at least one organic foam material to be mixed with one another and reacted to produce the organic foam material.

The mixture (M) provided in step a) is preferably dispersed in the melt or in at least one of the individual components. Then, in the subsequent polymerization, the composite material, which comprises the mixture (M) and hence components (A) and (C), in dispersion in the at least one organic foam material (B), is obtained.

Most preferably in accordance with the invention component (B) is a polyurethane foam material. Methods for producing polyurethane foam materials are known to the skilled person. Polyurethane foam materials are preferably produced by reaction of a mixture containing isocyanate-reactive compounds with an isocyanate. The mixture containing isocyanate-reactive compounds is preferably a polyol mixture. The reaction may take place in the presence of a chemical or physical blowing agent. One preferred blowing agent is water. The reaction for producing polyurethane foam materials is described for example in Becker/Braun, *Plastics Handbook, volume 7, Polyurethane*, Carl Hanser Verlag Munich Vienna 1993.

Use of the Composite Material

The composite material of the invention may be used in particular in areas where there is a need for external or internal cooling. The composite material of the invention is used preferably for the cooling of buildings. In this case the composite material of the invention may be applied on the outer walls or incorporated into facades, in order to cool the outer walls of buildings. A further possible application is inside buildings; here, the composite material can be used for cooling and for moisture management of interiors. A further possible application relates to the cooling of electrical assemblies, of primary or secondary batteries, and/or for regulating the heat in furniture for sitting, in vehicles, in footwear, and in apparel. Possible applications additionally exist in the production of medical products, for moisture management of wounds, or for surface cooling of injuries or inflammation processes.

The composite material of the invention is used preferably, therefore, for cooling buildings, electrical assemblies, primary batteries or secondary batteries, exterior facades of buildings, of interiors, for production of medical products, and for regulating the heat in furniture for sitting, in vehicles, in footwear, and in apparel.

Another subject of the present invention is therefore the use of the composite material of the invention for cooling buildings, electrical assemblies, primary batteries or secondary batteries, exterior facades of buildings, of interiors, for production of medical products, and for regulating the heat in furniture for sitting, in vehicles, in footwear, and in apparel.

It is thought that the composite materials of the invention take on water below the lower critical solution temperature (LCST) of component (A). For example, the composite materials of the invention take up sufficient water for the weight ratio of the water taken up, relative to the composite material, to be in the range from 5:100 to 300:100, preferably in the range from 10:100 to 200:100, and especially preferably in the range from 20:100 to 100:100.

The water taken up by the composite material may be taken up, for example, from the surrounding environment, customarily in the form of precipitation or of atmospheric moisture. It is also possible for the composite material to be deliberately wetted with water. Preferably the composite material takes up the water from the surrounding environment.

If the temperature rises to the lower critical solution temperature (LCST) of component (A) or above, then the composite material gives up water, which through capillary forces is distributed uniformly in the organic foam material of the composite material and, as a result of the increased surface area, allows optimum evaporation of the water. The heat of evaporation required for this purpose is used to cool down the composite material. The present invention is elucidated in more detail below by means of examples, without implying any limitation thereto.

EXAMPLES

Preparation of a Mixture (M) from Components (A) and (C)

The following components were used:

Monomers:

N-Isopropylacrylamide (NiPAAm) from Wako Chemicals and from TCl Chemicals

N,N'-Methylenebisacrylamide (BIS) from AppliChem and Merck KGaA

[3-(Methacryloylamino)propyl]trimethylammonium chloride solution (MAPTAC; 50 wt % in water) from ABCR GmbH Clay Mineral:

Sodium bentonite: EXM757 from Süd-Chemie

Initiators:

N,N,N',N'-Tetramethylethylenediamine (TEMEDA) from ABCR GmbH

Potassium peroxodisulfate (KPS) from Sigma-Aldrich

Ammonium peroxodisulfate (APS) from Grüssing GmbH Analytica

Sodium bentonite (162 g, 113 mmol of sodium) was swollen in deionized water (2 l). Then further deionized water was added, giving the dispersion a volume of 12 liters in total. NiPAAM (1000 g, 8840 mmol), BIS (50 g, 324 mmol, 5 wt % based on NiPAAM), and MAPTAC (50 g of a 50 wt % strength solution in water, 113 mmol, 5 wt % based on NiPAAM) were added to the dispersion, to give the first dispersion. After devolatilization with nitrogen, the first dispersion was heated to 80° C. and KPS (20 g, 74 mmol, 2 wt % based on NiPAAM) was added in order to initiate the polymerization of the monomers. The polymerization was carried out at 80° C. for 6 hours. After cooling had taken place, 5 liters of deionized water were added in order to reduce the viscosity of the resulting second dispersion. The particles of the mixture (M) present in the second dispersion had a diameter in the range from 1 to 2 mm. The water fraction of the second dispersion was 90 wt %, based on the overall weight of the second dispersion.

The second dispersion was subsequently dried by different methods.

a) Spray Drying of the Second Dispersion

Spray drying was carried out using a Nubilosa® LTC-ME laboratory spray dryer. The entry temperature was set at 165° C., the exit temperature was regulated at 85 to 90° C. by means of the injected second dispersion. The second dispersion was atomized with compressed air (5 bar)

through a two-component nozzle (diameter 2 mm). The residual moisture content of the resulting mixture (M) was 3 wt %. The mixture (M) obtained by spray drying is referred to below as (M-S).

b) Centrifugation and Subsequent Drying at Room Temperature

The resulting second dispersion was centrifuged at 4200 rpm in a CEPA LS laboratory centrifuge with a polyamide filter bag. The resulting mixture was subsequently dried at room temperature for 5 days and finally ground. The residual moisture content of the mixture (M) obtained was 6 wt %. The mixture (M) obtained by centrifugation and subsequent drying at room temperature is referred to below as (M-C).

Figure 1A:
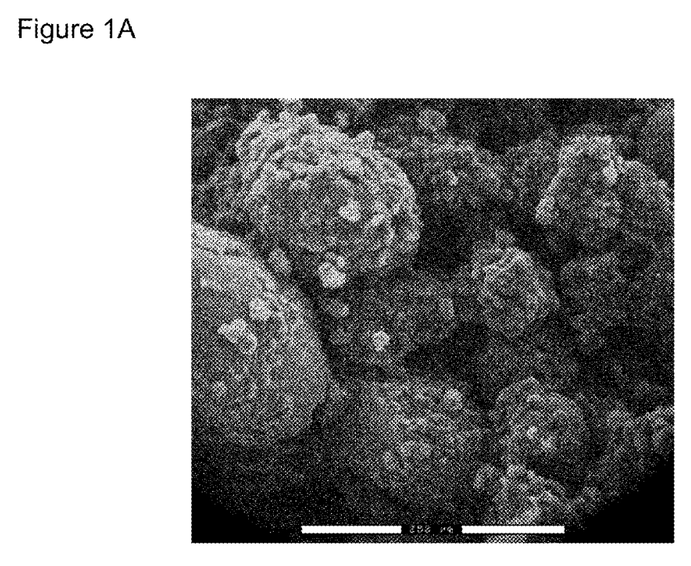
FIGS. 1A and 1B show the results of determining the morphology of the particles present in M-S by analyzing the particles using environmental scanning electron microscopy (ESEM 2020 from ElectroScan), equipped with a gaseous secondary electron detector (GSED).
Figure 1B:
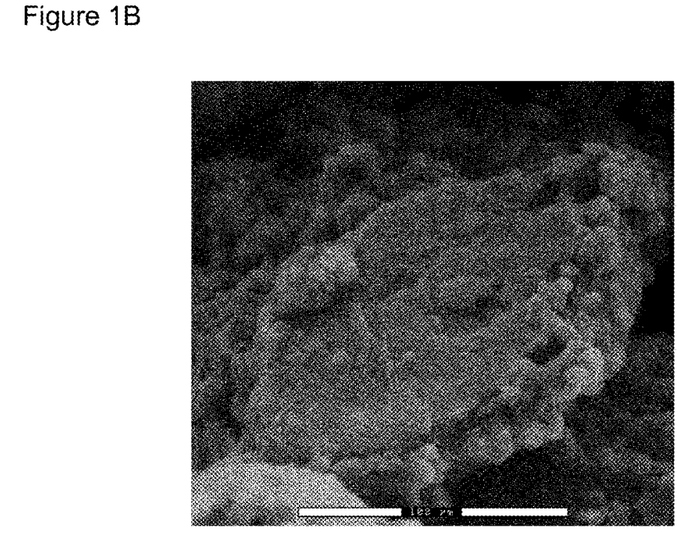

In order to determine the morphology of the particles present in M-S and M-C, the particles were analyzed by environmental scanning electron microscopy (ESEM 2020 from ElectroScan), equipped with a GSED (gaseous secondary electron detector). The results are shown in FIGS. 1a and 1b for (M-S) and 2a and 2b for (M-C).

Figure 2A:
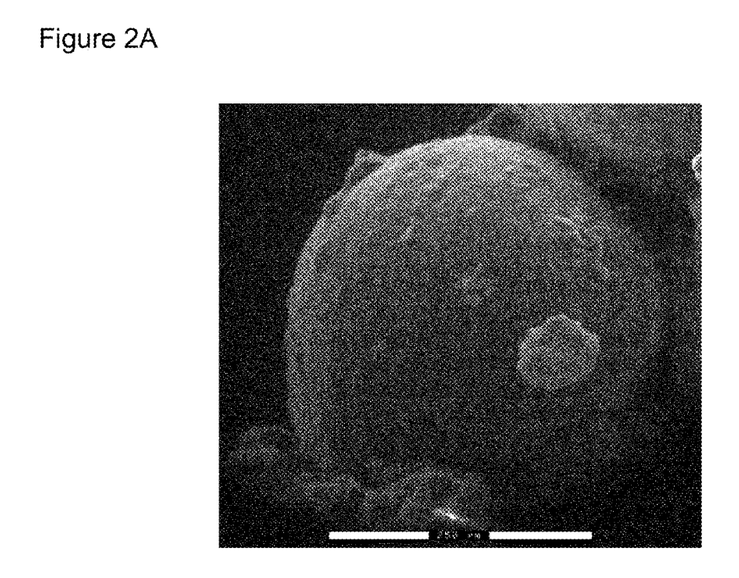
FIGS. 2A and 2B show the results of determining the morphology of the particles present in M-C by analyzing the particles using environmental scanning electron microscopy (ESEM 2020 from ElectroScan), equipped with a gaseous secondary electron detector (GSED).
Figure 2B:
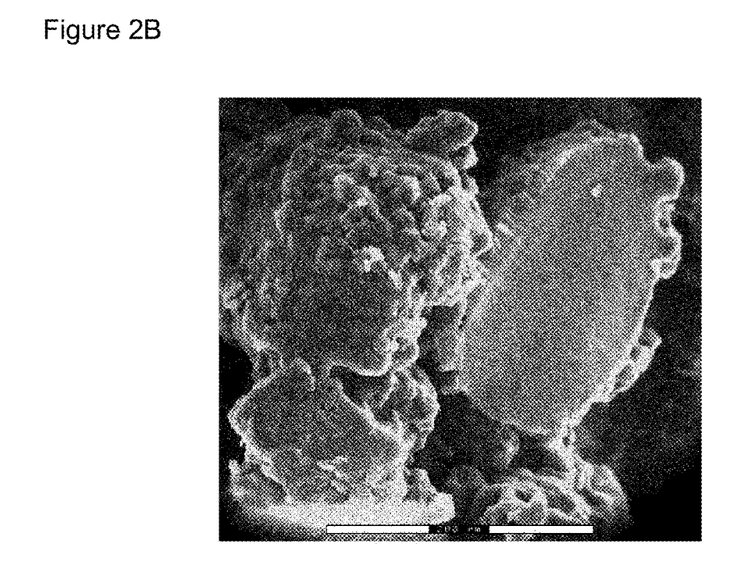

It can be seen that significantly smaller particles having a diameter of around 100 μm are obtained by the spray drying (FIGS. 1a and 1b), in comparison to centrifuged and subsequently dried particles, whose diameter is around 300 μm (FIGS. 2a and 2b). The particles of the clay mineral are disposed on the surface of the thermoresponsive polymer.

Production of Organic Foam Material and Composite Material

The organic foam material and the composite material were produced using the following components:

Polyols:
P1 mixture of 95 parts by weight polyetherol P1a (obtained from the propoxylation of glycerol and subsequent ethoxylation (OH number=28 mg KOH/g, 15% EO content)) and 5 parts by weight polyetherol P1b (obtained from the propoxylation of glycerol and subsequent ethoxylation (OH number=42 mg KOH/g, 70% EO content)).
P2 mixture of 42.5 parts by weight polyetherol P2a (obtained from the propoxylation of glycerol and subsequent ethoxylation (OH number=35 mg KOH/g)), 57 parts by weight polyetherol P2b (obtained from the propoxylation of glycerol and subsequent ethoxylation (OH number=27 mg KOH/g)), and 0.5 part by weight triethanolamine.
P3 mixture of 66.5 parts by weight polyetherol P3a (obtained from the propoxylation of sucrose and glycerol (OH number=490 mg KOH/g)) and 33.5 parts by weight polyetherol P3b (obtained from the ethoxylation of trimethylolpropane (OH number=600 mg KOH/g)).
P4 mixture of 61 parts by weight polyetherol P4a (obtained from the propoxylation of sucrose and glycerol (OH number=450 mg KOH/g)), 25.5 parts by weight polyetherol P4b (obtained from the ethoxylation/propoxylation of vicinal toluenediamine)), and 13.5 parts by weight polyetherol P4c (obtained from the propoxylation of trimethylolpropane (OH number=160 mg KOH/g)).

Catalysts:
K1: diazabicyclo[2.2.2]octane (DABCO)
K2: N,N-dimethylcyclohexane

Stabilizer:
Silicone surfactant DABCO® DC 193, Air Products

Blowing Agents:
Water and cyclopentane (Merck KGaA)

Superabsorbent (SAP):
Luquasorb® 1010 from BASF SE, polyacrylate, cross-linked

Isocyanate:
Iso 1: mixture of 2,4'-methylenediphenyl isocyanate (2,4'-MDI), 4,4'-methylenediphenyl isocyanate (4,4'-MDI), and polymeric MDI (polymeric methylenediphenyl isocyanate), NCO content: 33%
Iso 2: uretonimine-modified isocyanate prepolymer based on methylenediphenyl isocyanate (MDI), NCO content=28 wt %
Iso 3: polymeric MDI (polymeric methylenediphenyl isocyanate) (Lupranat M 20 W, BASF SE), NCO content=32 wt %

Mixture (M):
M-S (Spray-Dried)

To produce the organic foam material, the polyol, the catalyst, the stabilizer, and the blowing agent were premixed with thorough stirring in a disposable container in the quantities reported in table 1, after which the isocyanate was added and the mixture was homogenized by vigorous stirring within 5 seconds. The reaction mixture was then immediately transferred to a metal mold with dimensions of 40×40×40 cm, in which it foamed and cured.

The resulting cubes of the organic foam material were then cut into slices 2 cm thick and used for the passive cooling tests.

To produce a composite material additionally comprising the mixture (M) or the superabsorbent (SAP) as well as the organic foam material, the organic foam material was produced as described above, but the mixture (M) or the superabsorbent (SAP) was first dispersed together with the polyol, catalyst, stabilizer, and blowing agent before the isocyanate was added.

The start time, the gelling time, and the rise time, and also the density, of the resultant organic foam materials and composite materials are reported in table 1.

The start time is the time from the start of the mixing of polyol, catalyst, stabilizer, blowing agent, and isocyanate until a change in or marked increase in the viscosity of the reaction mixture becomes visually perceptible.

The gelling time is the timespan from the start of the mixing of polyol, catalyst, stabilizer, blowing agent, and isocyanate until the state is reached in which the product mixture is no longer fluid. The gelling time is determined by contacting a wooden stick with the rising foam, and corresponds to the point in time at which strings can be observed for the first time when the wooden stick is being extracted.

The rise time is the time from the start of the mixing of polyol, catalyst, stabilizer, blowing agent, and isocyanate up to the end of the rising process.

It is apparent that the superabsorbent provides a significant increase in particular in the start time and the gelling time and also in the density of the composite materials contained, relative to pure organic foam materials. The mixture (M) exhibits virtually no effect on the start time and gelling time and also the density.

The organic foam materials and composite materials of examples V1, B2, B3, B4, V5, and V6 are flexible foam materials (open-cell); the organic foam materials and composite materials of examples V7, B8, and B9 are semirigid foam materials; the organic foam materials and composite materials of examples V10, B11, and B12 are water-foamed rigid foam materials (closed-cell), and the organic foam materials and composite materials of examples V13, B14, B15, B16, V17, and V18 are rigid foam materials (closed-cell) foamed with water/cyclopentane.

TABLE 1

| | P1 [parts by wt.] | P2 [parts by wt.] | P3 [parts by wt.] | P4 [parts by wt.] | K1 [parts by wt.] | K2 [parts by wt.] | Stabilizer [parts by wt.] | Water [parts by wt.] | Cyclopentane [parts by wt.] | (M-S) [parts by wt.] | SAP [parts by wt.] | Iso 1 [parts by wt.] | Iso 2 [parts by wt.] | Iso 3 [parts by wt.] | Start time [s] | Gelling time [s] | Rise time [s] | Density [g/l] |
|---|---|---|---|---|---|---|---|---|---|---|---|---|---|---|---|---|---|---|
| V1 | 96.2 | — | — | — | 0.5 | — | 0.3 | 3 | — | — | — | 46 | — | — | 16 | 119 | 180 | 52 |
| B2 | 96.2 | — | — | — | 0.5 | — | 0.3 | 3 | — | 3 | — | 46 | — | — | 16 | 119 | 180 | 51 |
| B3 | 96.2 | — | — | — | 0.5 | — | 0.3 | 3 | — | 14 | — | 46 | — | — | 17 | 119 | 180 | 52 |
| B4 | 96.2 | — | — | — | 0.5 | — | 0.3 | 3 | — | 25 | — | 46 | — | — | 18 | 119 | 180 | 54 |
| V5 | 96.2 | — | — | — | 0.5 | — | 0.3 | 3 | — | — | 1.5 | 46 | — | — | 22 | 200 | 280 | 84 |
| V6 | 96.2 | — | — | — | 0.5 | — | 0.3 | 3 | — | — | 4.8 | 46 | — | — | 32 | 220 | 290 | 95 |
| V7 | — | 95 | — | — | 0.8 | — | 1.3 | 2.9 | — | — | — | — | 62 | — | 12 | 56 | 61 | 49 |
| B8 | — | 95 | — | — | 0.8 | — | 1.3 | 2.9 | — | 14 | — | — | 62 | — | 12 | 56 | 83 | 56 |
| B9 | — | 95 | — | — | 0.8 | — | 1.3 | 2.9 | — | 25 | — | — | 62 | — | 14 | 57 | 91 | 60 |
| V10 | — | — | 95.9 | — | 0.1 | 0.5 | 1 | 2.5 | — | — | — | — | — | 140 | 24 | 71 | 90 | 50 |
| B11 | — | — | 95.9 | — | 0.1 | 0.5 | 1 | 2.5 | — | 7 | — | — | — | 140 | 24 | 70 | 91 | 51 |
| B12 | — | — | 95.9 | — | 0.1 | 0.5 | 1 | 2.5 | — | 14 | — | — | — | 140 | 26 | 73 | 93 | 51 |
| V13 | — | — | — | 92.4 | 1.4 | 0.7 | 3 | 2.5 | 13 | — | — | — | — | 134 | 8 | 47 | 78 | 27 |
| B14 | — | — | — | 92.4 | 1.4 | 0.7 | 3 | 2.5 | 13 | 3 | — | — | — | 134 | 8 | 47 | 79 | 26 |
| B15 | — | — | — | 92.4 | 1.4 | 0.7 | 3 | 2.5 | 13 | 14 | — | — | — | 134 | 9 | 49 | 80 | 29 |
| B16 | — | — | — | 92.4 | 1.4 | 0.7 | 3 | 2.5 | 13 | 25.6 | — | — | — | 134 | 9 | 50 | 78 | 29 |
| V17 | — | — | — | 92.4 | 1.4 | 0.7 | 3 | 2.5 | 13 | — | 3 | — | — | 134 | 19 | 200 | 288 | 63 |
| V18 | — | — | — | 92.4 | 1.4 | 0.7 | 3 | 2.5 | 13 | — | 25.5 | — | — | 134 | 35 | 250 | 340 | 122 |

Water Absorption of the Composite Materials

Four cuboidal blocks with edge lengths of 6×6×2 cm, made from the different organic foam materials and the composite materials (specimens), were each first weighed, then placed into deionized water, and taken out after 1 hour and again after 91 hours. The water absorption, determined as the average value from four measurements, corresponded in this case to the weight increase after drip-drying of the specimens, minus the original dry weight of the specimen. The water content of the specimens was then calculated relative to the total weight of the specimen, in wt %.

The water content of the various specimens is reported in table 2.

TABLE 2

| | Water content after 1 h [wt %] | Water content after 91 h [wt %] |
|---|---|---|
| V1 | 77 | 87 |
| B2 | 68 | 94 |
| B3 | 69 | 94 |
| B4 | 69 | 92 |
| V5 | 76 | 90 |
| V6 | 80 | 91 |
| V7 | 68 | 86 |
| B8 | 73 | 93 |
| B9 | 70 | 91 |
| V10 | 20 | 36 |
| B11 | 34 | 48 |
| B12 | 70 | 82 |
| V13 | 34 | 51 |
| B14 | 32 | 60 |
| B15 | 43 | 70 |
| B16 | 55 | 74 |
| V17 | 44 | 61 |
| V18 | 70 | 90 |

It can be seen that rigid foam materials exhibit the lowest water absorption, while the flexible foam materials exhibit the highest water content. This can be attributed to the open-cell nature of the flexible foam materials.

On the basis of the water content after 1 hour and after 91 hours, it is apparent that, while the composite materials of the invention do absorb water more slowly than the pure organic foam material and also than the composite materials which comprise a superabsorbent, they nevertheless have at least the same or else higher proportions of water after 91 hours than the comparative materials. An exception is comparative experiment V18. The high superabsorbent content of the material ensures a likewise high water absorption and hence a high water content, but the foam has a very coarse, heterogeneous foam structure and also a high density. The disadvantages which result from these facts, in terms of mechanical and insulation properties, make the material an unattractive one for subsequent application as composite material.

Passive Cooling

For determination of the passive cooling behavior of the composite materials produced in comparison with pure organic foam materials, sample specimens of the materials with dimensions of 6×6×2 cm were placed at an angle of 40° and at a distance of 35 cm from an infrared lamp (500 W halogen). A constant stream of air was passed over the sample specimens at a flow rate of 0.1 m/s. An infrared camera was used to determine the temperature profile on the surface of the materials.

In order to determine the change in water content, the sample specimens of the composite material and of the comparative materials were placed on a balance and the weight of the sample specimens was determined as a function of time.

In order to determine the cooling effect of the composite material and of the comparative materials, a sample specimen of the composite material or of the comparative material was placed on a panel of a pure organic foam material and, between the panel of the organic foam material and of the composite material or of the comparative material, a thermocouple was introduced, which determined the temperature on the reverse of the sample specimens to be tested.

a) Surface Temperature and Water Content

The surface temperatures and also the water content of the composite material of example B3 and of the comparison material of example V1 were determined over a period of 360 minutes. The initial water content of the samples (94 wt % for B3 and 87 wt % for V1; see table 2) was set at 100% and the percentage decrease in weight of both samples over time was monitored.

Figure 3:
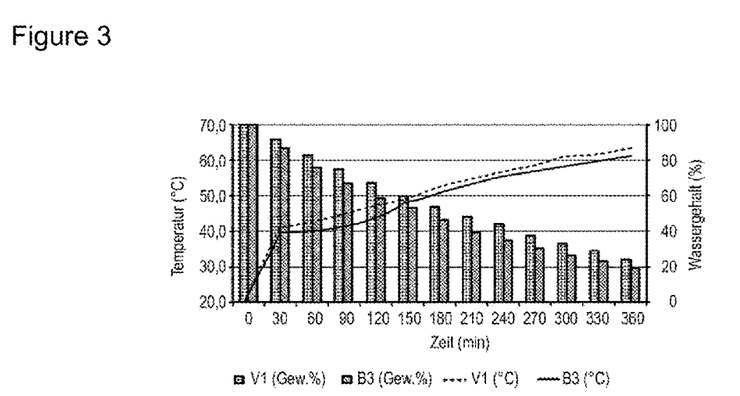
FIG. 3 shows the results of the surface temperatures and also the water content of the composite material of example B3 and of the comparison material of example V1 determined over a period of 360 minutes.

FIG. 3 shows the results of this test.

It can be seen that at the start of the measurement, the rate of evaporation of the water is identical in both examples B3 and V1. After about 30 minutes, already more water has evaporated from the composite material of example B3. Over the entire measurement period, more water evaporates from the material of example B3 than from the comparison material V1, and so a smaller water content property is left in the case of example B3. At the same time, owing to the greater rate of evaporation, the inventive composite material B3 exhibits a lower surface temperature and hence a greater cooling effect.

b) Two-Layer Measurements

For the measurements on flexible foam materials, the comparative material employed was the organic foam material of comparative example V1; the composite material used was that of example B3, and the composite material of comparative example V6 was also used. The plate of organic foam material on which the composite material and the comparative materials V1 and V6 were placed was an organic foam material as per comparative example V1.

For the measurement on rigid foam materials, the organic foam material of comparative example V13 was employed as composite material, as was the composite material of example B16 and the composite material of comparative example V18. The plate of organic foam material on which the composite material was placed was the organic foam material as per comparative example V13.

Figure 4A:
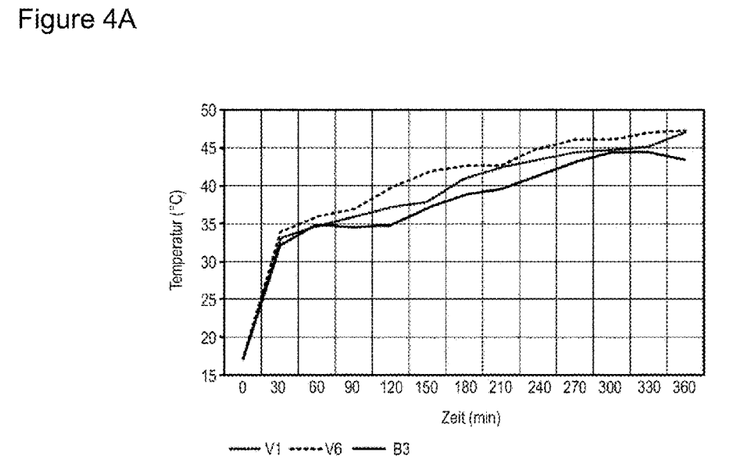
FIGS. 4A and 4B show the results of measurements of surface temperature and reverse temperatures for flexible foam materials.
Figure 4B:
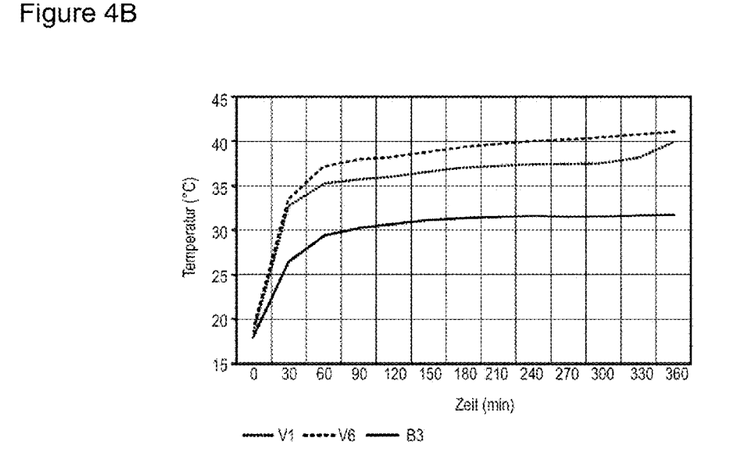
Figure 5A:
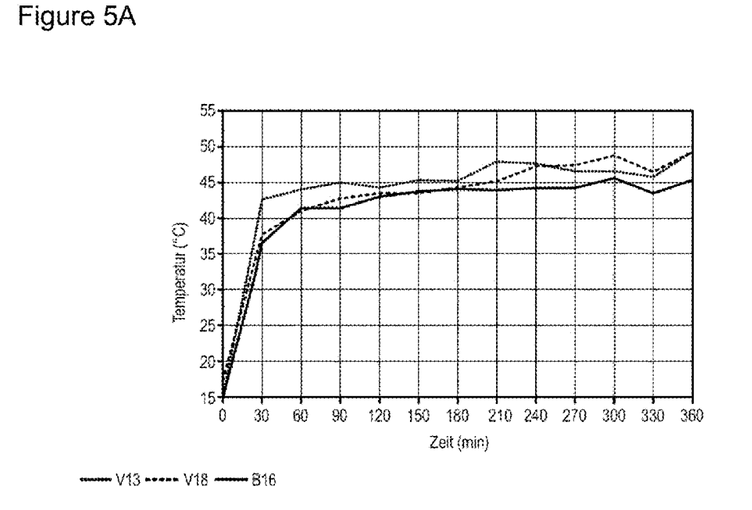
FIGS. 5A and 5B show the results of measurements of surface temperature and reverse temperatures for rigid foam materials.
Figure 5B:
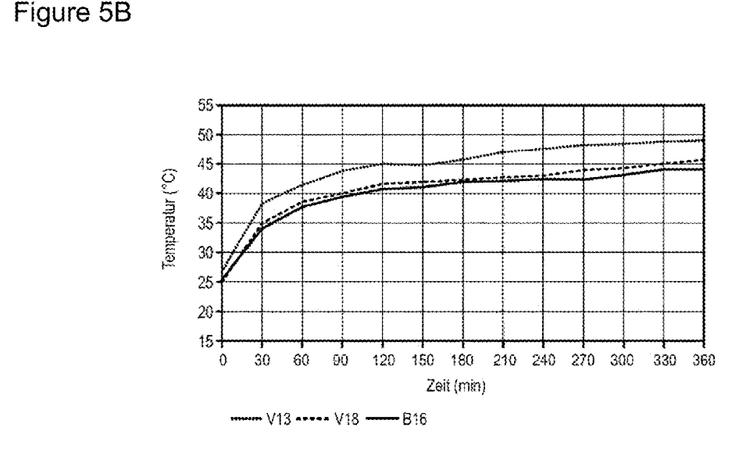

The results are reported in FIGS. 4a and 4b for the flexible foam materials and in FIGS. 5a and 5b for the rigid foam materials.

FIGS. 4a and 5a each show the surface temperature over the measurement period, with FIGS. 4b and 5b each showing the reverse temperatures.

From FIGS. 4b and 5b it is apparent that the reverse temperature of the composite material of the invention is lower in each case than that of the comparative examples. With the composite material of the invention, therefore, a higher cooling effect is achieved than with the materials of the comparative examples.

The invention claimed is:

1. A composite material comprising components:
(A) at least one thermoresponsive polymer,
(B) at least one organic foam material,
the component (A) having a lower critical solution temperature (LCST), the lower critical solution temperature (LCST) being in the range from 5 to 70° C. and wherein component (B) is selected from polyurethane foam materials, and wherein the composite material further comprises a component
(C) at least one clay mineral,
wherein component (C) is a layered silicate and wherein the lower critical solution temperature (LCST) being the temperature at which component (A) and water exhibit a miscibility gap.

2. The composite material according to claim 1, wherein component (A) is selected from the group consisting of poly(meth)acrylates, poly(meth)acrylamides, poly(meth)acryloylpyrrolidines, poly(meth)acryloylpiperidines, poly-N-vinylamides, polyoxazolines, polyvinyloxazolidones, polyvinylcaprolactones, polyvinylcaprolactams, polyethers, hydroxypropylcelluloses, polyvinyl ethers, and polyphosphoesters.

3. The composite material according to claim 1, wherein component (B) is open-cell to an extent of at least 50%.

4. The composite material according to claim 1, wherein component (C) is selected from the group consisting of montmorillonites and kaolinites.

5. The composite material according to claim 1, wherein the composite material comprises in the range from 0.5 to 50 wt% of component (A), in the range from 25 to 99.49 wt% of component (B), and in the range from 0.01 to 50 wt% of component (C), based in each case on the sum of the weight percentages of components (A), (B), and (C).

* * * * *